United States Patent
Storm et al.

(10) Patent No.: US 6,996,199 B2
(45) Date of Patent: *Feb. 7, 2006

(54) APPROACH FOR PROCESSING DATA RECEIVED FROM A COMMUNICATIONS CHANNEL TO REDUCE NOISE POWER AND OPTIMIZE IMPULSE RESPONSE LENGTH TO REDUCE INTER-SYMBOL INTERFERENCE AND INTER-CHANNEL INTERFERENCE

(75) Inventors: Andrew Storm, Hawthorn (AU); Shane M. Tonissen, Kensington (AU); Efstratios Skafidas, Coburg (AU)

(73) Assignee: Bandspeed, Inc., Austin, TX (US)

( * ) Notice: Subject to any disclaimer, the term of this patent is extended or adjusted under 35 U.S.C. 154(b) by 796 days.

This patent is subject to a terminal disclaimer.

(21) Appl. No.: 10/056,728

(22) Filed: Jan. 22, 2002

(65) Prior Publication Data

US 2002/0131537 A1    Sep. 19, 2002

Related U.S. Application Data

(60) Provisional application No. 60/264,506, filed on Jan. 25, 2001.

(51) Int. Cl.
*H04B 1/10*    (2006.01)

(52) U.S. Cl. .................................................... 375/350
(58) Field of Classification Search ................ 375/350, 375/316, 346, 229, 230, 297, 232; 330/2, 330/149; 708/322, 323

See application file for complete search history.

(56) References Cited

U.S. PATENT DOCUMENTS

| | | | |
|---|---|---|---|
| 5,068,873 A | 11/1991 | Murakami | 375/13 |
| 5,111,481 A | 5/1992 | Chen et al. | 375/14 |
| 5,432,816 A | 7/1995 | Gozzo | 375/232 |
| 5,432,821 A | 7/1995 | Polydoros et al. | 375/340 |
| 5,703,903 A * | 12/1997 | Blanchard et al. | 375/232 |
| 5,715,280 A | 2/1998 | Sandberg et al. | 375/260 |

(Continued)

FOREIGN PATENT DOCUMENTS

EP        0 795 985 A2    9/1997

(Continued)

OTHER PUBLICATIONS

Melsa, P., et al., "Impulse Response Shortening for Discrete Multitone Transceivers", IEEE Transactions on Communications, vol. 44, No. 12, Dec. 1996.

(Continued)

*Primary Examiner*—Khai Tran
(74) *Attorney, Agent, or Firm*—Hickman Palermo Truong & Becker, LLP

(57) ABSTRACT

An approach for processing data received from a communications channel that minimizes noise power and optimizes impulse response length to reduce interference, such as from inter-symbol interference (ISI) and inter-channel interference (ICI), is disclosed. For example, finite impulse response (FIR) filtering may be used with FIR coefficients that are determined by optimizing a function of the impulse response length and the noise power. The impulse response length is optimized based on the communications channel transfer function to reduce interference. The noise power is minimized based on the noise covariance as determined using the total noise power density. The approach accounts for noise from a variety of interference sources besides ISI and ICI. The result is a superior equalizer for use in communications receivers employing orthogonal frequency division multiplexing or discrete multitone modulation in communications protocols employing Asymmetric Digital Subscriber Line, G.Lite and Very High Bit Rate DSL.

69 Claims, 5 Drawing Sheets

U.S. PATENT DOCUMENTS

| | | | |
|---|---|---|---|
| 6,295,326 B1 | 9/2001 | Tonissen et al. | 375/350 |
| 6,388,513 B1 * | 5/2002 | Wright et al. | 330/2 |
| 6,788,752 B1 * | 9/2004 | Andre | 375/350 |
| 2002/0044014 A1 * | 4/2002 | Wright et al. | 330/2 |
| 2002/0131537 A1 * | 9/2002 | Storm et al. | 375/350 |

FOREIGN PATENT DOCUMENTS

| | | |
|---|---|---|
| EP | 0 912 023 A1 | 4/1999 |
| EP | 1.043 875 A2 | 10/2000 |
| WO | WO 97/40587 | 10/1997 |
| WO | WO 98/59450 | 12/1998 |
| WO | WO 00/54472 | 9/2000 |

OTHER PUBLICATIONS

Al-Dhahir, N., et al., "Optimum Finite-Length Equalization for Multicarrier Transceivers", IEEE Transactions on Communications, vol. 44, No. 1, Jan. 1996.

Chow, J., et al., "A Discrete Multitone Transceiver System for HDSL Applications", IEEE Journal on Selected Areas in Communications, vol. 9, No. 6, Aug. 1991.

Bellanger, M. G., "Adaptive Digital Filters and Signal Analysis", 1987, XP002169514, pp. 4-12 and 179-183.

Dalle Mese, et al., "Fixed-Lag Smoother for Digital Channel Equalisation", Electronic Letters, IEE Stevenage, vol. 13, No. 12, Jun. 9, 1997, p. 366-367, XP0000761143, ISSN: 0013-5194.

Chen, W. Y., "DSL: Simulation Techniques and Standards Development for Digital Subscriber Line Systems", 1988, XP002169513, pp. 8, 9, 11, 149-159.

Van Bladel, Mark and Moeneclaey, Marc, "Time-domain Equalization for Multicarrier Communication," IEEE Global Telecommunications Conference, Nov. 14, 1995, pp. 167 171.

Lashkarian, Navid and Kiaei, Sayfe, "Fast Algorithm for Finite-Length MMSE Equalizers with Application to Discrete Multitone Systems," IEEE International Conference on Acoustics, Speech, and Signal Processing, Mar. 15, 1999, pp. 2753-2756.

* cited by examiner

APPROACH FOR PROCESSING DATA RECEIVED FROM A COMMUNICATIONS CHANNEL TO REDUCE NOISE POWER AND OPTIMIZE IMPULSE RESPONSE LENGTH TO REDUCE INTER-SYMBOL INTERFERENCE AND INTER-CHANNEL INTERFERENCE

RELATED APPLICATION

This application claims domestic priority from prior U.S. provisional application Ser. No. 60/264,506, entitled "METHOD AND APPARATUS FOR EQUALIZATION AND NOISE MINIMIZATION IN A COMMUNICATIONS RECEIVER USING DISCRETE MULTITONE MODULATION," filed Jan. 25, 2001, naming as inventors A. Storm, S. Tonissen, and E. Skafidas, the entire disclosure of which is hereby incorporated by reference for all purposes as if fully set forth herein.

FIELD OF THE INVENTION

The present invention generally relates to digital communications systems, and more specifically, to an approach for processing data received from a communications channel to reduce noise power and optimize impulse response length to reduce inter-symbol interference and inter-channel interference.

BACKGROUND OF THE INVENTION

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

There is a continuing need for higher performance digital data communications systems. Perhaps nowhere is this need more evident than on the worldwide packet data communications network now commonly referred to as the "Internet." On the Internet, the "richness" of content is constantly increasing, requiring an ever-increasing amount of bandwidth to provide Internet content to users. As a result of this increased demand for bandwidth, significant efforts have been made to develop new types of high-speed digital data communications systems. For example, optical fiber based networks are being built in many large metropolitan areas and undersea to connect continents. As another example, new wireless protocols are being developed to provide Internet content to many different types of small, portable devices.

One of the significant drawbacks of deploying many of these new types of high-speed digital data communications systems is the high cost and amount of time required to develop and build out the new infrastructure required by the systems. Because of these high costs, many new high-speed digital data communications systems are initially deployed only in densely populated areas, where the cost of building out the new infrastructure can be quickly recovered. Less populated areas must often wait to receive the new communications systems and some rural areas never receive the new systems where it is not cost effective to build the infrastructure.

For several reasons, significant efforts are being made to utilize conventional twisted pair telephone lines to provide high-speed digital data transmission. First, a significant amount of twisted pair telephone line infrastructure already exists in many countries. Thus, using conventional twisted pair telephone lines avoids the cost of building expensive new infrastructure. Second, conventional twisted pair telephone lines extend into customers' homes and businesses, avoiding the so-called "last mile" problem. As a result of recent development efforts in this area, several new communications protocols, such as Asymmetric Digital Subscriber Line (ADSL), G.Lite and Very High Bit Rate DSL (VDSL), have been developed for providing high-speed digital transmission over conventional twisted pair telephone lines.

Despite the advantages to using conventional twisted pair telephone lines to provide high-speed digital communications, there are some problems with this approach. First, conventional twisted pair telephone lines cause signal attenuation per unit length that increases rapidly with frequency. A moderate length twisted pair line, for example around fifteen thousand feet, may cause only a few decibels (dB) of attenuation in the voice band, for which the line was originally designed, but many tens of dB of attenuation at higher transmission frequencies, for example around 1.1 MHz for ADSL. This results in a transfer function with a wide dynamic range and a wide variation in group-delay, making communications channel equalization more difficult. The transfer function is further complicated by bridge taps and impedance mismatches between line sections that cause reflections and echoes at the receiver. Furthermore, filtering performed at the transmitter and receiver also increases the complexity of the transfer function. The result is a very long communications channel impulse response, which creates significant inter-symbol interference (ISI) in a conventional digital communications receiver due to the resulting overlap of adjacent symbols and also may result in inter-channel interference (ICI).

The standards for ADSL and G.Lite specify Discrete Multitone (DMT) modulation. DMT is also under consideration for use in VDSL systems. DMT modulation generally involves transmitting digital data on a number of carriers simultaneously. Modulation and demodulation are performed using a Fast Fourier Transform (FFT). A cyclic prefix is added to the data prior to transmission to ensure separation between successive DMT symbols and eliminate inter-symbol interference (ISI) and to help reduce inter-channel interference (ICI) at the receiver. In practice, the cyclic prefix is necessarily quite short, generally much shorter than the impulse response of the communications channel. This often results in significant ISI and ICI being present in the received data. Large amounts of ISI and ICI cause a large reduction in the available communications bandwidth. This is especially true for long twisted pair telephone lines likely to be encountered in ADSL and VDSL communications systems. The effect of this ISI is to reduce the signal to noise ratio (SNR) in each bin of the FFT demodulator employed in a DMT system.

Standard equalizers used in digital communications systems, such as adaptive least mean square (LMS), Kalman, and recursive least squares (RLS) equalizers, are generally inappropriate for DMT systems since such standard equalizers are not designed to eliminate ISI and ICI. If the impulse response of the overall communications channel and equalizer is longer than the cyclic prefix, ISI and ICI can still occur. As a result, conventional approaches for equalizer design have the objective of shortening the overall communications channel plus equalizer impulse response so that the overall impulse response is shorter than the length of the cyclic prefix. Various attempts to reduce the overall impulse response to less than the length of the cyclic prefix have been made, including the use of finite impulse response (FIR) equalizers. See for example, *Impulse Response Shortening for Discrete Multitone Transceivers*, by P. Melsa, R. Younce, and C. Rohrs, IEEE Transactions on Communications, Vol. 44 No. 12, December 1996; *Optimum Finite-Length Equalization for Multicarrier Transceivers*, by N. Al-Dhahir and J. Cioffi, IEEE Transactions on Communications, Vol. 44 No. 1, January 1996; and *A Discrete Multitone Transceiver System for HDSL Applications*, by J. Chow, J. Tu, and J. Cioffi, IEEE Journal on Selected Areas in Communications, Vol. 9 No. 6, August 1991. Determining equalizer coefficients is generally a computationally inefficient process and can be quite sensitive to noise, which limits the practical application of the techniques found in these references.

A problem with conventional approaches that shorten the overall impulse response is that no consideration is given to the spectrum of noise on the communications channel. In particular, a common misconception of the conventional approaches is that a FIR equalizer leaves the signal to noise ratio (SNR) unaffected if the FIR equalizer eliminates ISI by shortening the impulse response. This misconception arises from an inadequate analysis of how demodulation by a non-windowed finite length FFT affects the noise power on the demodulated tones. As used herein, the term "tones" is synonymous with "frequencies."

The effect of the non-windowed FFT is to cause a smearing of the equalized noise power across the tones on the communications channel. The smearing affect can be very pronounced for narrow band interference sources, such as amplitude modulation (AM) radio signals. In addition, deep nulls in the equalize frequency response cause an attenuation of the signal, which is not reproduced in the noise, and as a result, even white noise at the input can be spread across the tones. The result of the smearing of the noise is a reduction in the SNR on the affected tones. Due to this reduction in the SNR, conventional approaches attempt to limit the range of the equalizer frequency response, but doing so in an ad hoc manner may result in an unacceptably large ISI.

Based on the foregoing, there is a need for an approach for processing data received from a communications channel that takes into account noise while reducing inter-symbol interference and inter-channel interference and that does not suffer from the limitations of conventional approaches.

SUMMARY OF THE INVENTION

Techniques are provided for processing data received from a communications channel to reduce noise power and optimize impulse response length to reduce inter-symbol interference and inter-channel interference. According to one aspect of the invention, received data that is based upon both modulated data and noise is received from the communications channel. The modulated data is the result of original data that is modulated onto one or more carriers. The received data is equalized using an equalizer to generate equalized data. The equalizer uses an algorithm with a set of coefficients that are selected based on noise power and an impulse response of the communications channel. An estimate of the original data is recovered by demodulating the equalized data.

According to other aspects of the invention, the coefficients are selected according to one or more particular approaches. For example, the coefficients may be selected to optimize impulse response length of the communications channel to reduce interference, such as inter-symbol interference (ISI) and inter-channel interference (ICI), to reduce noise power, or to simultaneously optimize impulse response length and reduce noise power, or the coefficients may be selected to minimize noise power. As another example, the coefficients may be selected to reduce noise power due to ISI, ICI, and noise from additional interference sources, including, but not limited to, crosstalk, AM radio signals, and white Gaussian noise. As yet another example, the coefficients may be selected by minimizing a function of communications channel impulse response and noise power, or based on noise power spectral density.

According to yet other aspects of the invention, the received data is modulated using a cyclic prefix and the coefficients are selected to ensure that an impulse response of the communications channel and the equalizer is less than the cyclic prefix. Equalizing the received date includes processing the received data using a finite impulse response (FIR) filter, and the received data is modulated using discrete multitone modulation and a set of FIR coefficients selected to reduce noise power and optimize impulse response length. The communications channel is a twisted pair telephone line that uses a transmission protocol such as Asymmetric Digital Subscriber Line (ADSL), G.Lite or Very High Bit Rate DSL (VDSL).

According to another aspect of the invention, coefficients are determined for use in a filter to process data received from a communications channel. A communications channel transfer function and a noise power spectral density are determined based on the received data. A communications channel impulse response is determined based on the communications channel transfer function, and a noise covariance is determined based on the noise power spectral density. Based on the communications channel impulse response and the noise covariance, the coefficients for use in the filter are determined.

According to other aspects of the invention, a computer-readable medium, a carrier wave, an apparatus, and a system are configured to carry out the foregoing functions.

BRIEF DESCRIPTION OF THE DRAWINGS

The present invention is depicted by way of example, and not by way of limitation, in the figures of the accompanying drawings and in which like reference numerals refer to similar elements and in which.

DETAILED DESCRIPTION OF THE INVENTION

Figure 1:
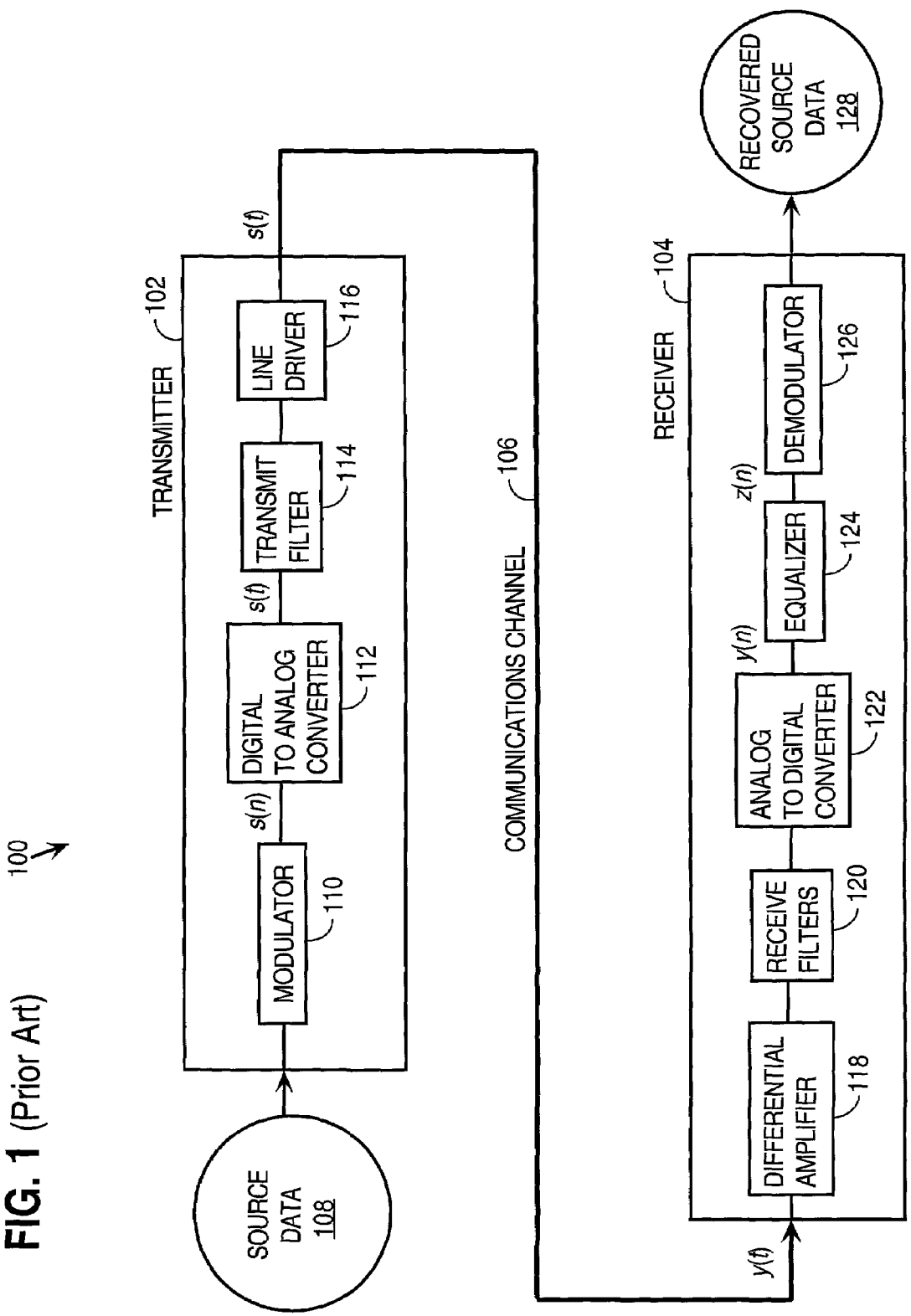
FIG. 1 is a block diagram of a conventional digital data communications arrangement.

An approach for processing data received from a communications channel to reduce noise power and optimize impulse response length to reduce inter-symbol interference and inter-channel interference is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are depicted in block diagram form in order to avoid unnecessarily obscuring the present invention.

In the following description, the various functions shall be discussed under topic headings that appear in the following order:
I. Overview
 A. Communications System Arrangement
 B. Receiver
 C. Communications Processing
 D. Discrete Multitone Modulation
II. FIR Filtering
III. Theoretical Background for FIR Filter Coefficient Estimation
IV. FIR Filter Coefficient Estimation
 A. Overview of FIR Filter Coefficient Estimation Approach
 B. Detailed Description of FIR Filter Coefficient Estimation
V. Implementation Mechanisms
VI. Extensions and Alternatives

I. OVERVIEW

An approach for processing data received from a communications channel to reduce noise power and optimize impulse response length to reduce inter-symbol interference and inter-channel interference generally involves minimizing a function of both the impulse response and the total noise from all sources of interference. A procedure is then derived for obtaining the coefficients of the equalizer, which enables the number of bits per symbol to be optimized. According to one embodiment of the invention, the equalizer coefficients are determined based on both reducing the communications channel noise due to all sources and on the distortion that results from the failure of the equalizer coefficients to completely eliminate ISI. It has been observed that using the so-called "optimal shortening filters," the ISI may be almost entirely eliminated. However, the equalizer can have a frequency response with a wide dynamic range resulting in SNR degradation due to smearing of the noise across tones. According to one embodiment of the invention, this degradation is eliminated, minimized, or at least reduced by taking into account the equalized noise power. The result is a superior equalizer for use in communications receivers employing orthogonal frequency division multiplexing or discrete multitone modulation.

As used herein, the term "noise" is broadly defined to refer to any error in a received signal as compared to the original transmitted signal. In the following discussion, the term "noise" includes all sources of noise, including ISI, ICI, and external sources of interference, such as AM radio signals and crosstalk resulting from interference from adjacent physical channels. Also, noise includes other interference sources, such as white Gaussian noise and distortion introduced by the receiver. While ISI is a source of noise that results from successive symbols interfering with each other because the impulse response is too long, ISI is referred to separately herein since ISI is a particular source of noise of interest herein. Similarly, while ICI is a source of noise that arises from adjacent tones interfering with each other on a signal or as an indirect result of the impulse response not being sufficiently short, ICI is referred to separately herein since ICI is a particular source of noise of interest herein.

The approach described herein addresses both (1) the problem of shortening the impulse response to reduce ISI and ICI and (2) reducing the total noise power at the output of the equalizer by using an optimization criteria for the FR coefficients that jointly (a) optimizes the impulse response length and (b) reduces the noise power at the output of the equalizer. Thus, by taking into account the actual noise conditions of the communications channel, the noise power is reduced while the impulse response is optimized.

A. Communications System Arrangement

FIG. 1 is a block diagram of a conventional communications system arrangement 100. Arrangement 100 includes a transmitter 102 communicatively coupled to a receiver 104 via a communications channel 106. Communications channel 106 may be any type of medium or mechanism for providing data from transmitter 102 to receiver 104. For purposes of explanation only, various embodiments of the invention are described herein in the context of communications channel 106 as a landline, such as one or more conventional twisted pair telephone lines.

Transmitter 102 receives digital source data 108, e.g., a digital data stream, that is modulated by a modulator 110 to generate a sampled data signal s(n), where n is the sample number, and the sampling rate is given by $F_s$. The sampled data signal s(n) is converted to an analog signal s(t) by a digital to analog converter 112. The analog signal s(t) is processed by a transmit filter 114 to remove unwanted components from the analog signal s(t). The analog signal s(t) is then amplified by a line driver 116 and transmitted onto communications channel 106.

It should be noted that the transmitted analog signal s(t) is not strictly a continuous time representation of the sampled data signal s(n) since transmit filter 114 modifies the signal, but is represented as such herein for the purposes of explanation.

The transmitted analog signal s(t) passes through communications channel 106, which has an impulse response of h(t) and corresponding transfer function H(f). The output of communications channel 106 x(t) is the convolution of the transmitted analog signal s(t) and the communications channel impulse response h(t), given by:

$$x(t)=s(t)*h(t) \tag{1}$$

The signal received by receiver 104 y(t) is the sum of the output of communications channel 106 x(t) and an additive noise signal w(t), given by:

$$y(t)=x(t)+w(t) \tag{2}$$

where the additive noise signal w(t) consists of any form of interference introduced by communications channel 106, for example crosstalk or AM radio signals, and an additive white Gaussian noise component.

A differential amplifier 118 processes the received signal y(t) to generate an amplified signal y(t). The amplified signal y(t) is then processed by one or more receive filters 120 to remove undesired components and generate a filtered signal y(t). The filtered signal y(t) is sampled by analog-to-digital converter 122 to generate a digital signal y(n) that at this point is still modulated. It should be pointed out that y(n) is not strictly a sampled version of y(t) due to the processing of receive filters 120 which modify the signal, but is represented as such herein for the purposes of explanation.

An equalizer 124 processes digital signal y(n) in the time domain to remove ISI and recover the transmitted modulated data z(n). While z(n) is not strictly the transmitted modulated data, but rather an equalized version of the received signal, z(n) is represented as such herein for purposes of explanation. A demodulator 126 processes the modulated data z(n) to generate recovered source data 128. For example, in a DMT system, demodulator 126 processes equalized data z(n), such as by using an FFI and a frequency domain equalizer (FDEQ), with the output of demodulator 126 closely approximating the source data 108.

For example, a time domain equalizer may be used to compensate for the communications channel in such a way as to maximize the signal to noise ratio (SNR) at the output of the demodulator. The optimal equalizer design depends on the nature of the modulation. For example, for a standard single carrier modulation such as quadrature amplitude modulation (QAM), the optimal equalizer minimizes the mean square error at the equalizer output, thereby maximizing the broadband SNR.

B. Receiver

Figure 2:
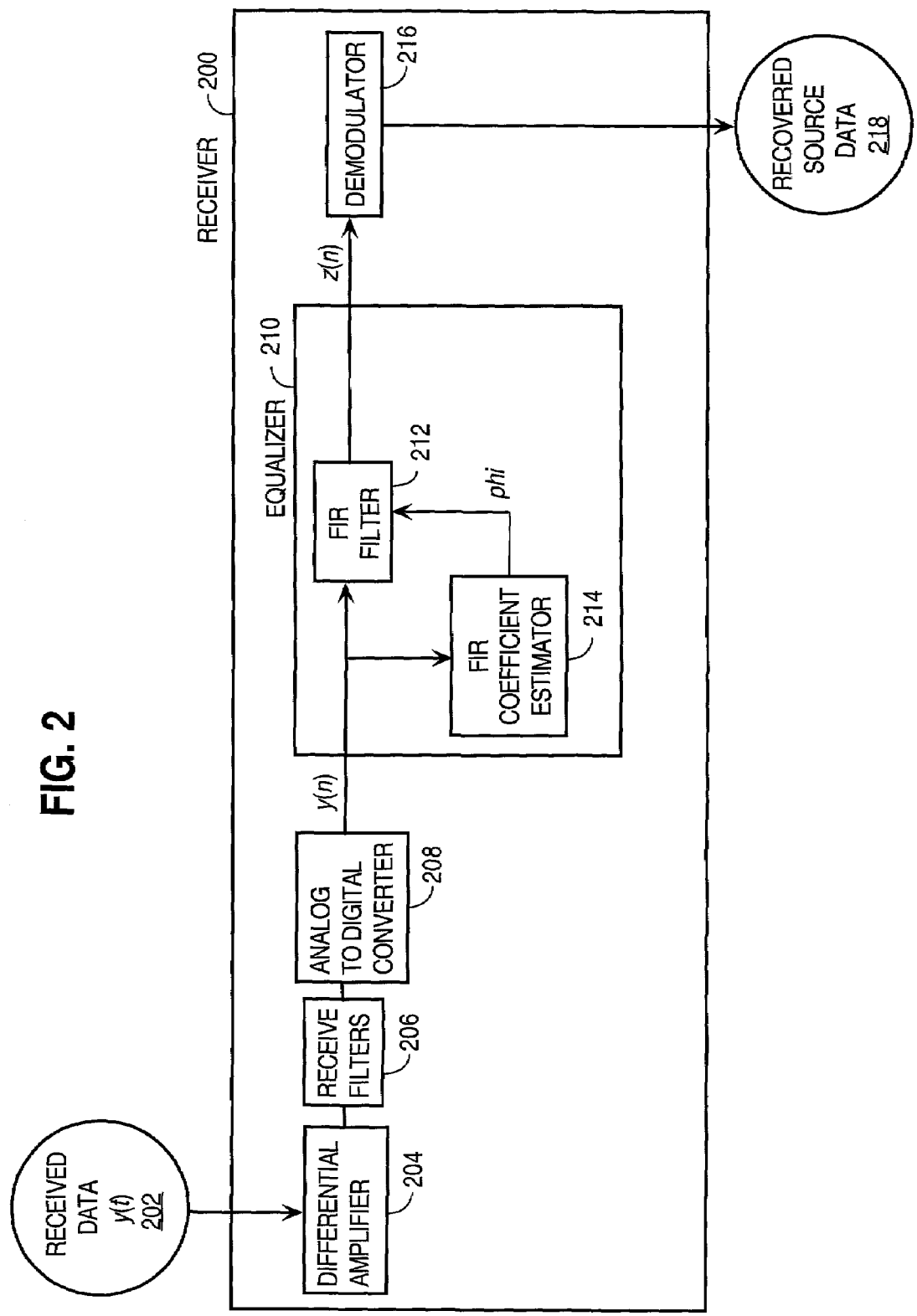
FIG. 2 is a block diagram of an arrangement for processing data received from a communications channel, according to an embodiment of the invention.

FIG. 2 is a block diagram of a receiver 200 for processing received data y(t) 202 from communications channel 106, according to an embodiment of the invention. As with the conventional arrangement 100 of FIG. 1, received data y(t) 202, obtained from communications channel 106, is the sum of the output of communications channel 106 x(t) and an additive noise signal w(t). The received data y(t) 202 is processed by a differential amplifier 204, one or more receive filters 206 and an analog-to-digital converter 208 to produce a sampled signal y(n), where n is the sample number.

The sampled signal y(n) is provided to an equalizer 210 that produces an estimate z(n) of the sampled communications channel 106 input signal that is provided to a demodulator 216. Demodulator 216 recovers an estimate of the original source data 108 in the form of recovered source data 218. For example, in a DMT system, demodulator 126 processes equalized data z(n), such as by using an FFT and a FDEQ, with the output of demodulator 126 closely approximating the source data 108. In general, demodulator 216 may perform several functions that may be performed by distinct entities, such as a time domain to frequency domain converter, a FDEQ for correcting any residual amplitude and phase distortion, and a constellation decoder.

According to one embodiment of the invention, equalizer 210 includes a finite impulse response (FR) filter 212 and an FIR coefficient estimator 214. FIR filter 212 processes the sampled signal y(n) to produce the estimate z(n) of the sampled communications channel 106 input signal. FIR coefficient estimator 214 determines the coefficients required by FIR filter 212. According to one embodiment of the invention, the coefficients for FIR filter 212 are selected such that distortion due to inter-symbol interference and demodulated noise power is reduced.

C. Communications Processing

Figure 3:
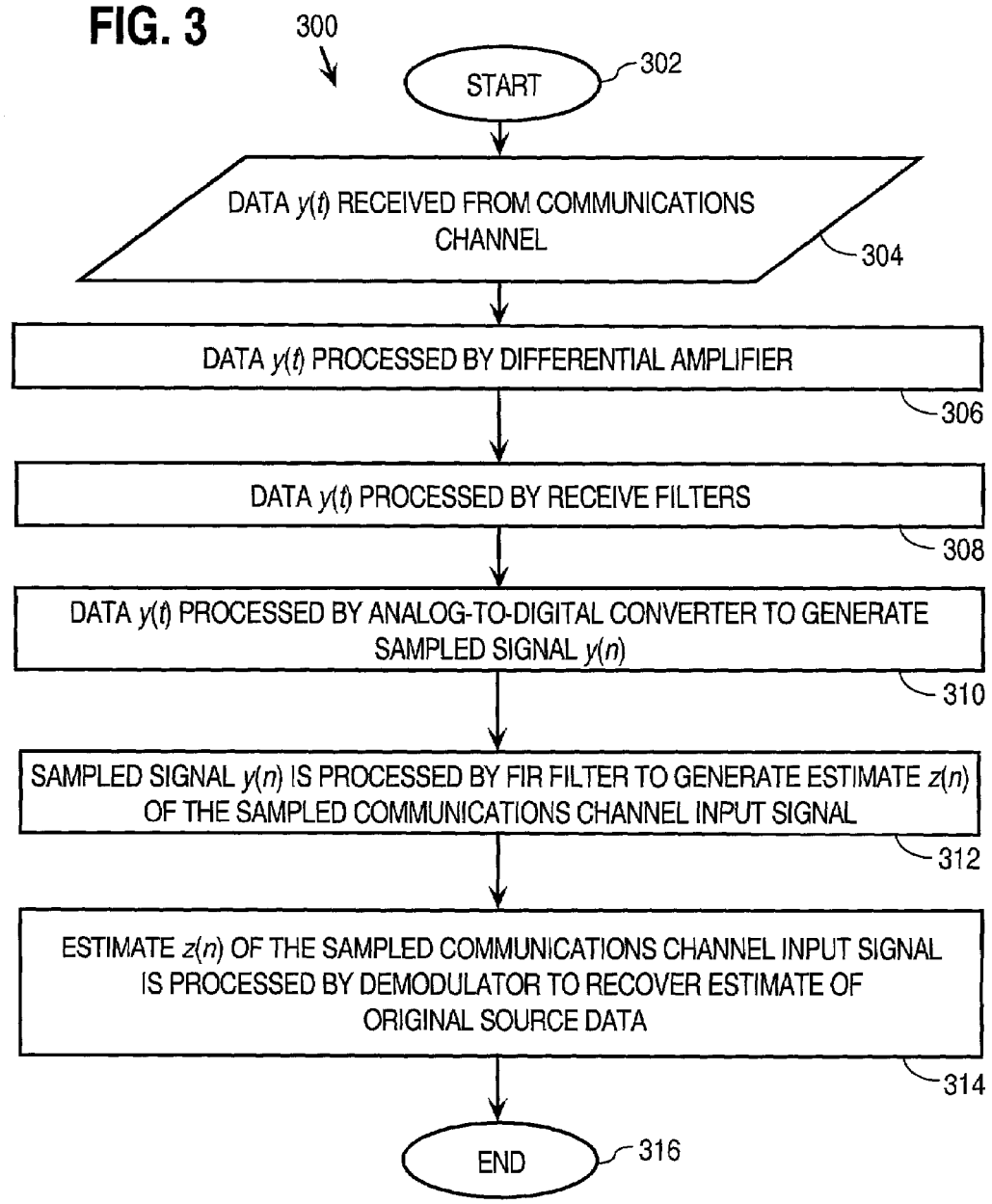
FIG. 3 is a flow diagram that depicts an approach for processing data received from a communications channel, according to an embodiment of the invention.

FIG. 3 is a flow diagram 300 that depicts an approach for processing data received from a communications channel, according to an embodiment of the invention. After starting in step 302, in step 304, received data y(t) is received from communications channel 106. In step 306, the received data y(t) is processed by differential amplifier 204 to generate amplified data y(t). In step 308, the amplified data is processed by the one or more receive filters 206 to generate filtered data y(t).

In step 310, the filtered data y(t) is sampled by analog-to-digital converter 208 to generate a sampled signal y(n). In step 312, the sampled signal y(n) is processed by FIR filter 212, which generates an estimate z(n) of the sampled communications channel 106 input signal. In step 314, the estimate z(n) of the sampled communications channel 106 input signal is provided to a demodulator 216 that recovers an estimate of the original source data 108 in the form of recovered source data 218. For example, in a DMT system, demodulator 126 processes equalized data z(n), such as by using an FFT and a FDEQ, with the output of demodulator 126 closely approximating the source data 108. The process is complete in step 316.

D. Discrete Multitone Modulation

According to one embodiment of the invention, the techniques described herein are related to time domain equalization for a DMT modulation system. In such a system, the focus is on the SNR in each narrow band associated with an individual carrier, not the broadband SNR across the entire communications channel bandwidth.

In DMT, the sample data signal s(n) is created from a sequence of symbols $(s_l)_{l \geq 0}$ as follows. Each symbol $s_l$ consists of a vector of length N of complex numbers:

$$s_l = (s_{lk})_{k=0}^{N-1} \quad (3)$$

where $s_{lk}$ is an element of a constellation of $2^{b_k}$ points. From $s_l$, a M=2N point vector $d_l$ is created having Hermitian symmetry. That is, $d_{l0}$ and $d_{lN}$ are real numbers, and $d_{l,M-k} = d_{lk}^*$ for $1 \leq k \leq N-1$. The vector $d_l$ is modulated by an inverse FFT to create:

$$x_{lr} = \frac{1}{M} \sum_{k=0}^{M-1} d_{lk} \exp\left(\frac{2\pi i r k}{M}\right). \quad (4)$$

The sequence $(x_{lr})_r$ is periodic in r with period M, so that $x_{l,-r} = x_{l,M-r}$. The signal s(n) is created from the sequence $(x_l)_{l \geq 0}$ by passing the M+c element vectors:

$$x_l = (x_{lr})_{r=-c}^{M-1} \quad (5)$$

through a parallel to serial converter. Since the first c elements of Equation (5) are equal to the last c, the effect is to create a prefix of length c equal to the last c symbols. This is known as a cyclic prefix. Formally, the relation between s(n) and $(x_l)_{l \geq 0}$ is given by:

$$s(n+l(M+c)) = x_{l,n-c}, \quad 0 \leq n \leq M+c-1. \quad (6)$$

The cyclic prefix is effective in eliminating ISI and ICI provided the sampled communications channel impulse response h(n) is shorter than the length of the cyclic prefix. Unfortunately, the nature of the communications channel, coupled with any transmit and receive filtering, will ensure that the impulse response is likely to be significantly longer than the cyclic prefix. This is especially true for long twisted pair telephone lines likely to be encountered in ADSL and VDSL communications systems. The effect of this ISI and ICI is to reduce the SNR in each bin of the FFT demodulator employed in a DMT system.

In order to prevent the ISI and ICI caused by a long communications channel impulse response, it is necessary to implement a time domain equalizer. The coefficients of this time domain equalizer should be chosen to ensure the overall response of the communications channel and equalizer is less than the length of the cyclic prefix. However, while reducing of ISI and ICI is an important concern, it is not the only issue of importance. As discussed below, SNR degradation due to the combined effects of noise, ISI, and ICI is also of concern.

Several attempts have been made to develop equalizers that reduce the length of the overall communications channel plus equalizer impulse response. For example, in *A Discrete Multitone Transceiver System for HDSL Applications*, by J. Chow, J. Tu, and J. Cioffi, IEEE Journal on Selected Areas in Communications, Vol. 9 No. 6, August 1991, (hereinafter "Chow") the approach is to identify an autoregressive-moving average (ARMA) model for the communications channel, and use the identified AR parameters as the equalizer. The procedure in Chow suggests canceling the communications channel denominator, but exact cancellation is never possible. Further, modeling the transfer function by a rational function and canceling the modeled denominator as in Chow is a very ad hoc procedure that does not take into account the effect of the equalizer on the noise.

As another example, in *Impulse Response Shortening for Discrete Multitone Transceivers*, by P. Melsa, R. Younce, and C. Rohrs, IEEE Transactions on Communications, Vol. 44 No. 12, December 1996, (hereinafter "Melsa") the procedure is to apply an eigenvector decomposition method to determine the optimal shortening filter subject to a finite energy constraint. Melsa claims that this gives superior performance to the ARMA communications channel identification method, but Melsa gives no consideration to the effect the equalizer has on the noise. Furthermore, the approach of Melsa for determining the equalizer coefficients is computationally expensive and can be sensitive to errors.

As yet another example, in *Optimum Finite-Length Equalization for Multicarrier Transceivers*, by N. Al-Dhahir and J. Cioffi, IEEE Transactions on Communications, Vol. 44 No. 1, January 1996, (hereinafter "Dhahir"), the optimization is performed based on maximizing the number of bits per DMT symbol, which is achieved by maximizing a term referred to as $SNR_{geom}$, the product of the individual signal to noise ratios for each tone. Unfortunately, the expression used in Dhahir for $SNR_{geom}$ is a constant for any linear equalizer and does not take into account the residual ISI. Furthermore, the approach of Dhahir for determining the equalizer coefficients is computationally expensive and can be sensitive to errors.

II. FIR FILTERING

As previously described herein, equalization is performed using FIR filter 212. The number of taps p+1 in FIR filter 212 is generally chosen based upon the requirements of a particular application. According to one embodiment of the invention, at least sixteen taps are used to ensure adequate equalizer results, particularly for longer loops. The samples of the input signal to FIR filter 212 are denoted by y(n), where n is the sample number. FIR filter 212 filters the sampled signal y(n) to form the filtered signal z(n) provided to demodulator 216, such that:

$$z(n) = \sum_{i=0}^{p} \varphi(i) y(n-i) \quad (7)$$

where $\{\varphi(i), i=0 \ldots p\}$ is the set of FIR filter coefficients. The FIR filter described by Equation (7) is the standard form of an FIR filter.

III. THEORETICAL BACKGROUND FOR FIR FILTERB COEFFICIENT ESTIMATION

FIR filter coefficient estimator 214 estimates the set of FIR coefficients, denoted by $\{\varphi(i), i=0 \ldots p\}$ for use in FIR filter 212. Using the approach described herein in this application, the coefficients are determined such that the total noise plus ISI and ICI power is reduced, and in some instances minimized, for the given communications channel conditions. This is achieved by determining coefficients that reduce the distortion due to ISI and ICI plus the demodulated noise power.

After being filtered by the equalizer, the signal is passed through a serial to parallel converter, discarding the first c samples from each block of length M+c, possibly with a delay or timing offset θ, to create a sequence of vectors $(z_m)_{m \geq 0}$, each of length M. Formally, the relation between z(n) and $(z_m)_{m \geq 0}$ is given by:

$$z_{mt} = z(\theta + c + t + m(M+c)), \quad 0 \leq t \leq M-1. \quad (8)$$

Each vector $z_m$ is demodulated by an FFT to create a sequence $(Z_m)_{m \geq 0}$, of demodulated symbols. The relationship between $z_m$ and $Z_m$ is:

$$Z_{mk} = \sum_{t=0}^{M-1} z_{mt} \exp\left(-\frac{2\pi i k t}{M}\right). \quad (9)$$

If the sequence $(d_l)_{l \geq 0}$ is uncorrelated, it may be shown that the demodulated symbol $Z_m$ is related to the transmitted symbol $d_m$ by:

$$Z_{mk} = F_k d_{mk} + V_{mk} \quad (10)$$

where $V_{mk}$ is a term representing the combined effects of noise and inter-symbol interference, $$F_k = \sum_{n=-M+1}^{M+c-1} g(n) a(n-\theta) \exp\left(-\frac{2\pi i k (n-\theta)}{M}\right), \quad (11)$$

$$g(n) = \sum_{k} \varphi(k) h(n-k) \quad (12)$$

is the equalized communications channel impulse response and a(n) is a window function related to the cyclic prefix by:

$$a(n) = \begin{cases} 1-(n-c)/M; & c < n < M+c \\ 1; & 0 \leq n \leq c \\ 1+n/M; & -M < n < 0 \end{cases} \quad (13)$$

Also, one may show that:

$$\sum_{k=0}^{M-1} E(|V_{mk}|^2) = \frac{M^2}{2\pi} \int_0^{2\pi} |\Phi(\omega)|^2 \Gamma(\omega) d\omega + \sum_{n=-\infty}^{\infty} \sum_{m=-\infty}^{\infty} g(n) g(m) \sigma(m-n) (J(n-\theta, m-\theta) - M a(n-\theta) a(m-\theta)) \quad (14)$$

where:

$$\Phi(\omega) = \sum_k \varphi(k)\exp(-i\omega k) \qquad (15)$$

is the equalizer frequency response, $\Gamma(\omega)$ is the noise power spectral density, $\sigma(n)$ is related to the transmitted power on each tone by:

$$\sigma(n) = \frac{1}{M}\sum_{k=0}^{M-1} S_k \exp\left(\frac{2\pi i n k}{M}\right) \qquad (16)$$

with:

$$S_k = E(|d_{mk}|^2), \qquad (17)$$

the function $J(x, y)$ is given by:

$$J(x, y) = \sum_{n=c}^{M+c-1} I\left(\left|\frac{n-x}{M+c}\right| = \left|\frac{n-y}{M+c}\right|\right) \qquad (18)$$

for any integers x and y, and I(condition) is equal to 1 if the condition is true and 0 otherwise. The expression given for:

$$\sum_{k=0}^{M-1} E(|V_{mk}|^2) \qquad (19)$$

is a quadratic function of the equalizer coefficients. If $\phi'=(\phi(0), \phi(1), \ldots, \phi(p))$ is the vector of equalizer coefficients and $\gamma(n)$ is the noise covariance, then:

$$\sum_{k=0}^{M-1} E(|V_{mk}|^2) = \varphi' N \varphi + \varphi' G \varphi \qquad (20)$$

where:

$$N_{kl} = M^2\gamma(k-l) \qquad (21)$$

and $$G_{kl} = \sum_{n=-\infty}^{\infty}\sum_{m=-\infty}^{\infty} h(n-k)h(m-k)\sigma(m-n) \qquad (22)$$
$$(J(n-\theta, m-\theta) - Ma(n-\theta)a(m-\theta))$$

Normally the expression for the ISI and ICI power is difficult to work out, but a particularly simple special case occurs when $S_k = S \forall k$, in which case:

$$\sigma(n) = SI(n = 0 \bmod(M)). \qquad (23)$$

Also, it is usually safe to assume that the equalized impulse response is zero for n outside the range 0 to M−1. In this case the ISI and ICI power reduces to:

$$SM\sum_{n=0}^{M-1} g(n)^2(1 - a(n-\theta)^2), \qquad (24)$$

which gives:

$$G_{kl} = SM\sum_{n=0}^{M-1} h(n-k)h(n-l)(1 - a(n-\theta)^2). \qquad (25)$$

IV. FIR FILTER COEFFICIENT ESTIMATION

A. Overview of FIR Filter Coefficient Estimation

Figure 4:
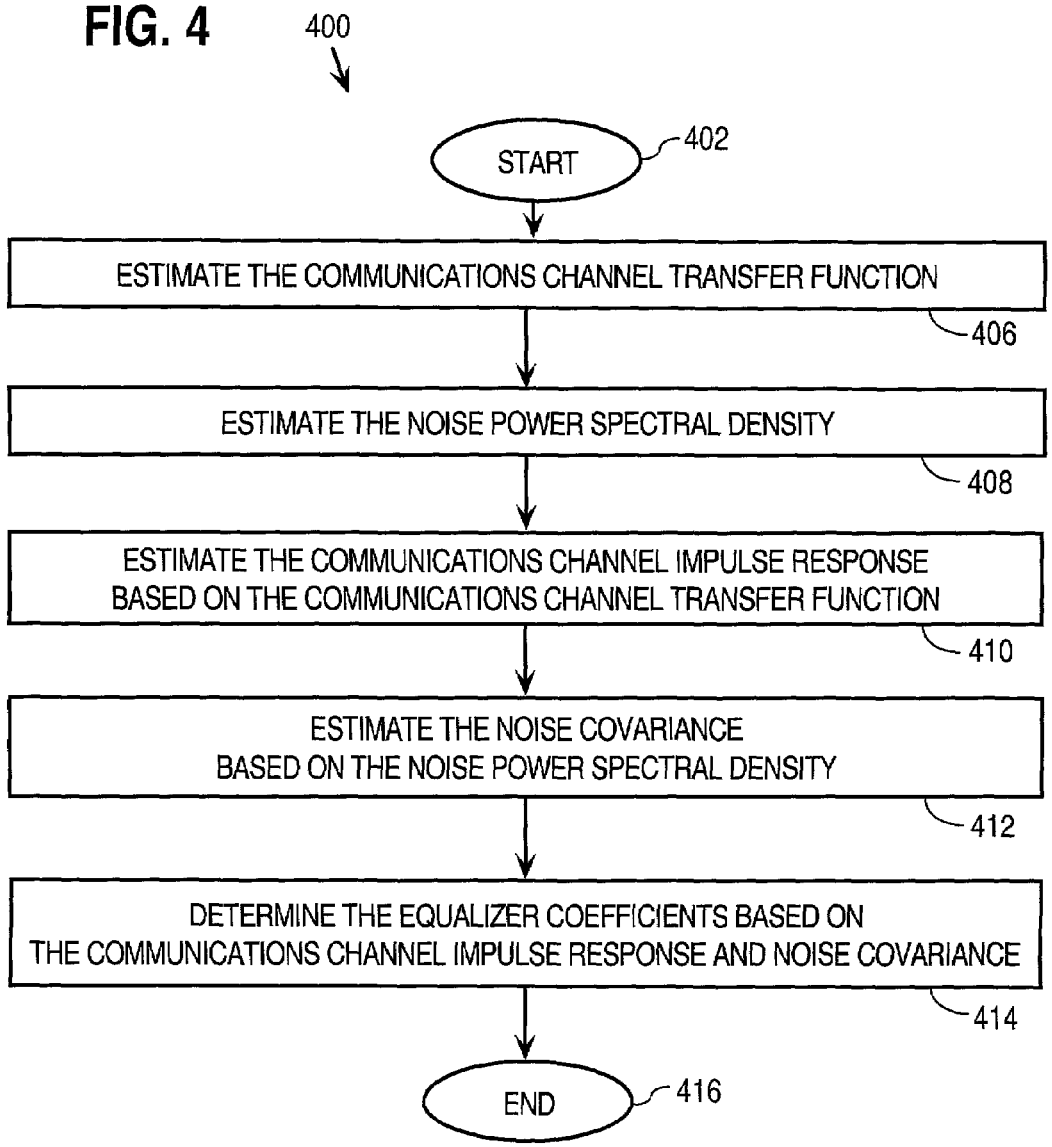
FIG. 4 is a flow diagram of an overview of FIR filter coefficient estimation, according to an embodiment of the invention.

FIG. 4 is a flow diagram 400 of an overview of FIR filter coefficient estimation, according to an embodiment of the invention. After starting in step 402, the communications channel transfer function is estimated in step 406. For example, in ADSL, a C_REVERB training sequence can be used to accumulate symbols over a given period to obtain an averaged received symbol, which taken with the known transmitted signal during the same period, provides an estimate of the communications channel frequency response. (e.g., the communications channel transfer function).

In step 408, the noise power spectral density is estimated. For example, in ADSL, the same part of the training sequence as in step 406 or another part of the training sequence can be used to measure received symbols at the output of the FFT. The average symbol is subtracted to remove the transmitted signal portion of the signal.

In step 410, the communications channel impulse response is estimated based on the communications channel transfer function. For example, an inverse FFT of the communications channel transfer function can be used to estimate the communications channel impulse response.

In step 412, the noise covariance is estimated based on the noise power spectral density. For example, an inverse FFT of the noise power spectral density can be used to estimate the noise covariance.

In step 414, the equalizer coefficients are determined based on the communications channel impulse response and the noise covariance. For example, two matrices can be formed based on the communications channel impulse response and the noise covariance. The matrix corresponding to the communications channel impulse response can include a window function related to the length of the cyclic prefix. A quadratic expression using the two matrices can be minimized based on an appropriate constraint on the equalizer to determine the equalizer coefficients. The filter coefficients thus determined can be rescaled, if desired.

The process is complete in step 416.

B. Detailed Description of FIR Filter Coefficient Estimation

According to one embodiment of the invention, the FIR filter coefficients used by FIR filter 212 are determined as follows:

(a) Estimate the communications channel frequency response $H_k$ in each tone (e.g., step 406). Such an estimation can be carried out during part of an initialization and training sequence, where a known symbol sequence is transmitted on a repeated basis. $H_k$ may be estimated as follows:

(i) Let:

$$(d_k)_{k=0}^{M-1} \tag{26}$$

be the repeatedly transmitted Hermitian symmetrised symbol block (prior to modulation). In an ADSL system, one of the C_REVERB sequences can be used to estimate the downstream communications channel transfer function.

(ii) Let $y_n$, n=0, ..., L be the sequence of received signal blocks, prior to demodulation. Each block $y_n$ is a vector of length M, consisting of the M received samples corresponding to the $n^{th}$ transmitted training symbol, and L is the total number of training symbols on which the transfer function is to be estimated. The demodulated signal corresponding to this block is given by:

$$Y_n = FFT(y_N) \tag{27}$$

that is, $$Y_{nk} = \sum_{t=0}^{M-1} y_{nt} \exp\left(-\frac{2\pi i k t}{M}\right). \tag{28}$$

(iii) Discard $Y_0$ to avoid end effects and calculate the average received symbol as:

$$\overline{Y} = \frac{1}{L} \sum_{n=1}^{L} Y_n \tag{29}$$

This may be computed via appropriate recursive formulae to avoid overflow problems.

(iv) The estimate of the communications channel transfer function is computed by the formula:

$$\hat{H}_k = \frac{\overline{Y}_k}{d_k} \tag{30}$$

for $1 \leq k \leq N-1$ and $N+1 \leq k \leq M-1$, with:

$$\hat{H}_0 = \hat{H}_N = 0 \tag{31}$$

since no data is transmitted at DC or Nyquist frequency. An alternative approximation is to interpolate values for $\hat{H}_0$ and $\hat{H}_N$ from the adjacent values of the transfer function to avoid discontinuities.

(b) Estimate the noise power spectral density (e.g., step 408).

(i) Apply a suitable window function $\kappa(s)$, $0 \leq s \leq M-1$ to each received symbol prior to demodulation to obtain:

$$\tilde{y}_{ns} = \overline{y}_{ns} \kappa(s), \tag{32}$$

(ii) then demodulate as before to obtain:

$$\tilde{Y}_{nk} = \sum_{s=0}^{M-1} \tilde{y}_{ns} \exp\left(-\frac{2\pi k s}{M}\right). \tag{33}$$

(iii) Estimate the noise power spectral density at frequency $2\pi k/M$ from the sample variance of $Y_{nk}$ as follows:

$$\hat{\Gamma}_k = \left(\frac{1}{L-1} \sum_{m=1}^{L} \left(\tilde{Y}_{nk} - \overline{\tilde{Y}}_k\right)^2\right) / \kappa^2 \tag{34}$$

where:

$$\kappa^2 = \sum_{s=0}^{M-1} \kappa(s)^2 \tag{35}$$

and:

$$\overline{\tilde{Y}} = \frac{1}{L} \sum_{m=1}^{L} \tilde{Y}_{mk}. \tag{36}$$

(c) Estimate the communications channel impulse response based on the communications channel transfer function (e.g., step 410). The communications channel impulse response is computed as the inverse FFT of $\hat{H}$:

$$\hat{h}(t) = \frac{1}{M} \sum_{k=0}^{M-1} \hat{H}_k \exp\left(\frac{2\pi i t k}{M}\right). \tag{37}$$

(d) Estimate the noise covariance based on the noise spectral power density (e.g., step 412). The noise covariance is computed as the inverse FFT of $\Gamma$:

$$\hat{\gamma}(t) = \frac{1}{M} \sum_{k=0}^{M-1} \hat{\Gamma}_k \exp\left(\frac{2\pi i t k}{M}\right). \tag{38}$$

(e) Determine the equalizer coefficients based on the communications channel impulse response and noise covariance (e.g., step 414).

(i) From the estimates $\hat{h}(t)$ and $\gamma(t)$, construct the $(p+1) \times (p+1)$ matrices N and G having elements:

$$N_{kl} = \gamma(k-l) \tag{39}$$

and $$G_{kl} = \sum_{n=0}^{M-1} \hat{h}(n-k) \hat{h}(n-l)(1 - a(n-\theta)^2). \tag{40}$$

(ii) The optimal set of equalize coefficients is obtained by minimizing the quadratic $\phi'(MN+SG)\phi$, but some constraint on φ is required, otherwise the minimum is obtained at φ=0. A numerically simple constraint, which gives good results, is obtained by setting φ(0)=1. If one writes φ'=(1, ζ') and partitions the matrix MN+SG as:

$$MN + SG = \begin{bmatrix} R & f' \\ f & F \end{bmatrix} \quad (41)$$

where R is a scalar, $f$ is p×1, and F is p×p, then the quadratic form Q=φ'(MN+SG)φ becomes:

$$Q = R + 2f'\zeta + \zeta'F\zeta \quad (42)$$

(iii) Equation (42) is minimized by setting ζ to be the solution to the set of linear equations:

$$F\zeta = -f. \quad (43)$$

(iv) The optimal set of FIR filter coefficients is then obtained as:

$$\varphi = \begin{pmatrix} 1 \\ \zeta \end{pmatrix}. \quad (44)$$

(v) If desired, the filter coefficients may be re-scaled as required, as re-scaling does not affect the signal to noise ratio.

(vi) In practice, one must also determine a value for the timing offset or delay, θ. Since the quadratic Q(θ) =φ'(MN+SG(θ))φ measures the noise plus ISI power once φ has been computed, a useful criterion for choosing θ is to minimize Q(θ). This minimization problem does not admit an analytical solution, so the optimum value may be found by searching over a given range using a one dimensional search technique such as a Fibonacci search.

V. IMPLEMENTATION MACHANISMS

The approach for processing data received from a communications channel to reduce noise power and optimize impulse response length to reduce inter-symbol interference described herein may be implemented in a variety of ways and the invention is not limited to any particular implementation. The approach may be integrated into any communications system or a receiver device, or may be implemented as a stand-alone mechanism. Furthermore, the approach may be implemented in computer software, hardware, or a combination thereof.

Figure 5:
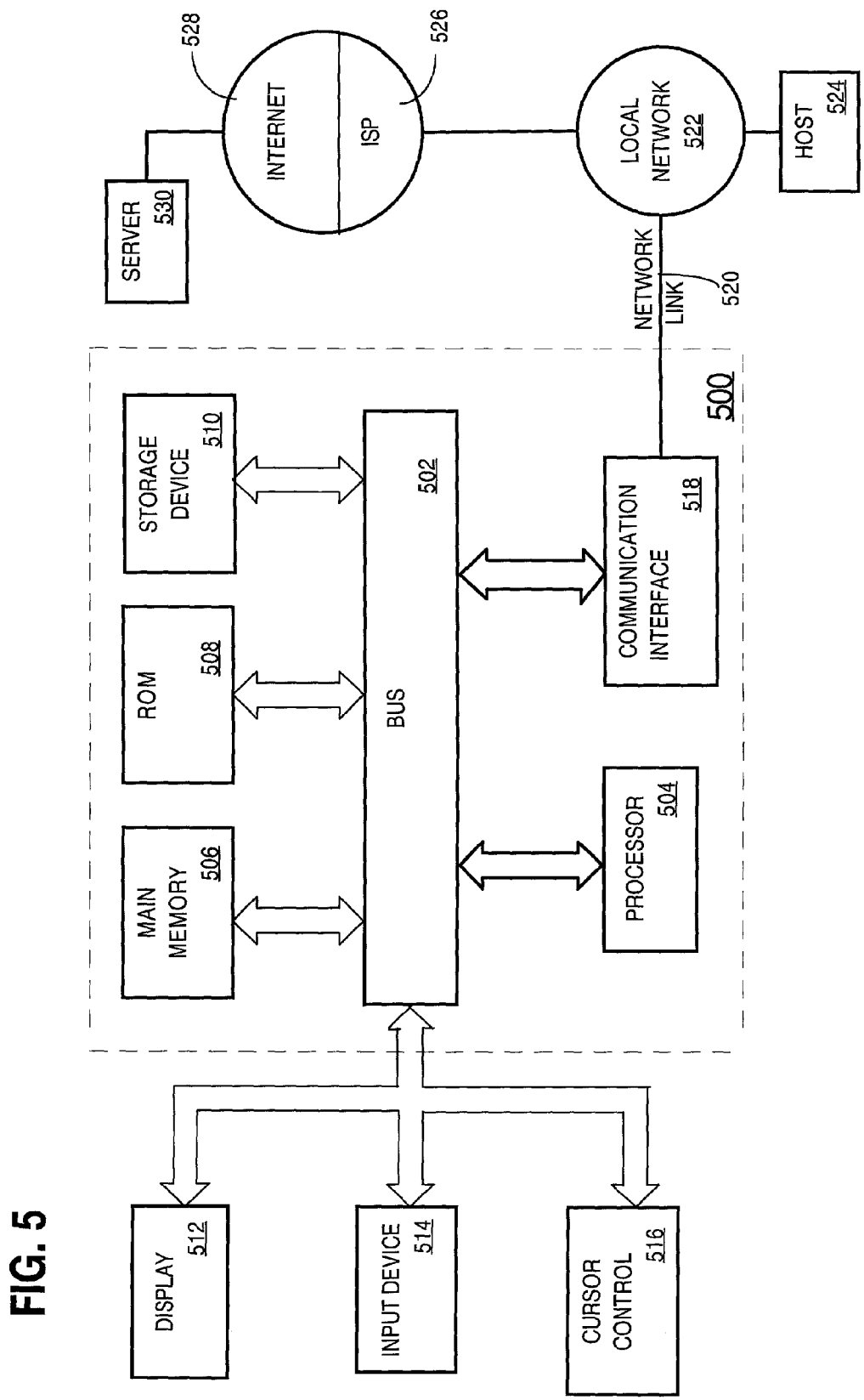
FIG. 5 is a block diagram of a computer system on which embodiments of the invention may be implemented.

FIG. 5 is a block diagram that depicts a computer system 500 upon which an embodiment of the invention may be implemented. Computer system 500 includes a bus 502 or other communications mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another computer-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communications interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

VI. EXTENSIONS AND ALTERNATIVES

In the foregoing specification, the invention has been described with reference to specific embodiments thereof. It will, however, be evident that various modifications and changes may be made thereto without departing from the broader spirit and scope of the invention. For example, while the techniques described herein are often described in the context of DMT systems, the techniques herein are equally applicable to an orthogonal frequency division multiplexing (OFDM) system. As another example, a FIR coefficient generator that is configured to perform the techniques described herein may be used. Therefore, the specification and drawings are, accordingly, to be regarded in an illustrative rather than a restrictive sense. The invention includes other contexts and applications in which the mechanisms and processes described herein are available to other mechanisms, methods, programs, and processes.

In addition, in this disclosure, certain process steps are set forth in a particular order, and alphabetic and alphanumeric labels are used to identify certain steps. Unless specifically stated in the disclosure, embodiments of the invention are not limited to any particular order of carrying out such steps. In particular, the labels are used merely for convenient identification of steps, and are not intended to imply, specify or require a particular order of carrying out such steps.

What is claimed is:

1. A method for processing data received from a communications channel comprising the computer-implemented steps of:
   at a receiver, receiving, from the communications channel, received data that is based upon both modulated data and noise that includes noise from a source that is external to the receiver, wherein the modulated data is the result of original data modulated onto one or more carriers;
   at the receiver, equalizing the received data to generate equalized data, wherein the equalizing is performed using an algorithm with a set of one or more coefficients selected based on noise power and an impulse response of the communications channel; and
   at the receiver, recovering an estimate of the original data by demodulating the equalized data.

2. The method as recited in claim 1, wherein the set of one or more coefficients is selected to optimize an impulse response length of the communications channel to reduce interference.

3. The method as recited in claim 2, wherein the interference includes inter-symbol interference.

4. The method as recited in claim 2, wherein the interference includes inter-channel interference.

5. The method as recited in claim 1, wherein the set of one or more coefficients is selected to reduce the noise power.

6. The method as recited in claim 5, wherein the set of one or more coefficients is selected to minimize the noise power.

7. The method as recited in claim 1, wherein the set of one or more coefficients is selected to simultaneously optimize an impulse response length of the communications channel to reduce interference and reduce the noise power.

8. The method as recited in claim 1, wherein a cyclic prefix is added to the modulated data and the set of one or more coefficients is selected to ensure that an impulse response of the communications channel and a device that performs the step of equalizing is less than a length of the cyclic prefix.

9. The method as recited in claim 1, wherein the set of one or more coefficients is selected to reduce the noise power due to inter-symbol interference, inter-channel interference, and noise from one or more additional interference sources.

10. The method as recited in claim 9, wherein the one or more additional interference sources are external to the receiver and includes at least one interference source selected from the group consisting of crosstalk, amplitude-modulated signals, and white Gaussian noise.

11. The method as recited in claim 1, wherein the set of one or more coefficients are selected by minimizing a function of communications channel impulse response and noise power.

12. The method as recited in claim 1, wherein the set of one or more coefficients are selected based on a noise power spectral density.

13. The method as recited in claim 1, wherein the step of equalizing the received data includes processing the received data using a finite impulse response (FIR) filter.

14. The method as recited in claim 13, wherein the received data is modulated using discrete multitone modulation and a set of one or more (FIR) coefficients for the FIR filter is selected to minimize the noise power and optimize impulse response length of the communications channel to reduce interference.

15. The method as recited in claim 1, wherein the communications channel is a twisted pair telephone line.

16. The method as recited in claim 15, wherein the twisted pair telephone line uses a transmission protocol selected from the group consisting of Asymmetric Digital Subscriber Line (ADSL), G. Lite and Very High Bit Rate DSL (VDSL).

17. A method for determining coefficients for use in a filter to process data received from a communications channel comprising the computer-implemented steps of:
  determining a communications channel transfer function based on the received data;
  determining a noise power spectral density based on the received data;
  determining a communications channel impulse response based on the communications channel transfer function;
  determining a noise covariance based on the noise power spectral density; and
  determining the coefficients based on the communications channel impulse response and the noise covariance.

18. The method as recited in claim 17, wherein the step of determining the communications channel transfer function includes the computer-implemented steps of:
  accumulating a plurality of symbol values based on the received data;
  determining an average received symbol value based on the received data; and
  determining the communications channel transfer function based on the plurality of symbol values and the average received symbol value.

19. The method as recited in claim 17, wherein the step of determining the noise power spectral density includes the computer-implemented steps of:
  measuring a plurality of symbol values based on the received data;
  determining an average received symbol value based on the received data; and
  determining the noise power spectral density based on the plurality of symbol values and the average received symbol value.

20. The method as recited in claim 17, wherein the step of determining the communications channel impulse response includes the computer-implemented step of:
  determining the communications channel impulse response based on an inverse fast Fourier transform (FFT) of the communications channel transfer function.

21. The method as recited in claim 17, wherein the step of determining the noise covariance includes the computer-implemented step of:
  determining the noise covariance based on an inverse fast Fourier transform (FFT) of the noise power spectral density.

22. The method as recited in claim 17, wherein the step of determining the coefficients includes the computer-implemented steps of:
  forming two matrices based on the communications channel impulse response and the noise covariance;
  generating a quadratic expression based on the two matrices; and
  minimizing the quadratic expression to determine the coefficients.

23. A computer-readable medium carrying one or more sequences of instructions for processing data received from a communications channel, wherein execution of the one or more sequences of instructions by one or more processors causes the one or more processors to perform the steps of:
  at a receiver, receiving, from the communications channel, received data that is based upon both modulated data and noise that includes noise from a source that is external to the receiver, wherein the modulated data is the result of original data modulated onto one or more carriers;
  at the receiver, equalizing the received data to generate equalized data, wherein the equalizing is performed using an algorithm with a set of one or more coefficients selected based on noise power and an impulse response of the communications channel; and
  at the receiver, recovering an estimate of the original data by demodulating the equalized data.

24. The computer-readable medium as recited in claim 23, wherein the set of one or more coefficients is selected to optimize an impulse response length of the communications channel to reduce interference.

25. The computer-readable medium as recited in claim 24, wherein the interference includes inter-symbol interference.

26. The computer-readable medium as recited in claim 24, wherein the interference includes inter-channel interference.

27. The computer-readable medium as recited in claim 23, wherein the set of one or more coefficients is selected to reduce the noise power.

28. The computer-readable medium as recited in claim 27, wherein the set of one or more coefficients is selected to minimize the noise power.

29. The computer-readable medium as recited in claim 23, wherein the set of one or more coefficients is selected to simultaneously optimize an impulse response length of the communications channel to reduce interference and reduce the noise power.

30. The computer-readable medium as recited in claim 23, wherein a cyclic prefix is added to the modulated data and the set of one or more coefficients is selected to ensure that an impulse response of the communications channel and a device that performs the step of equalizing is less than a length of the cyclic prefix.

31. The computer-readable medium as recited in claim 23, wherein the set of one or more coefficients is selected to reduce the noise power due to inter-symbol interference, inter-channel interference, and noise from one or more additional interference sources.

32. The computer-readable medium as recited in claim 31, wherein the one or more additional interference sources are external to the receiver and includes at least one interference source selected from the group consisting of crosstalk, amplitude-modulated signals, and white Gaussian noise.

33. The computer-readable medium as recited in claim 23, wherein the set of one or more coefficients are selected by minimizing a function of communications channel impulse response and noise power.

34. The computer-readable medium as recited in claim 23, wherein the set of one or more coefficients are selected based on a noise power spectral density.

35. The computer-readable medium as recited in claim 23, wherein the instructions for equalizing the received data further comprise instructions which, when executed by the one or more processors, cause the one or more processors to carry out the step of processing the received data using a finite impulse response (FIR) filter.

36. The computer-readable medium as recited in claim 35, wherein the received data is modulated using discrete multitone modulation and a set of one or more (FIR) coefficients for the FIR filter is selected to minimize the noise power and optimize impulse response length of the communications channel to reduce interference.

37. The computer-readable medium as recited in claim 23, wherein the communications channel is a twisted pair telephone line.

38. The computer-readable medium as recited in claim 37, wherein the twisted pair telephone line uses a transmission protocol selected from the group consisting of Asymmetric Digital Subscriber Line (ADSL), G.Lite and Very High Bit Rate DSL (VDSL).

39. A computer-readable medium carrying one or more sequences of instructions for determining coefficients for use in a filter to process data received from a communications channel, wherein execution of the one or more sequences of instructions by one or more processors causes the one or more processors to perform the steps of:
  determining a communications channel transfer function based on the received data;
  determining a noise power spectral density based on the received data;
  determining a communications channel impulse response based on the communications channel transfer function;
  determining a noise covariance based on the noise power spectral density; and
  determining the coefficients based on the communications channel impulse response and the noise covariance.

40. The computer-readable medium as recited in claim 39, wherein the instructions for determining the communications channel transfer function further comprise instructions which, when executed by the one or more processors, cause the one or more processors to carry out the steps of:
  accumulating a plurality of symbol values based on the received data;
  determining an average received symbol value based on the received data; and
  determining the communications channel transfer function based on the plurality of symbol values and the average received symbol value.

41. The computer-readable medium as recited in claim 39, wherein the instructions for determining the noise power spectral density further comprise instructions which, when executed by the one or more processors, cause the one or more processors to carry out the steps of:
  measuring a plurality of symbol values based on the received data;
  determining an average received symbol value based on the received data; and
  determining the noise power spectral density based on the plurality of symbol values and the average received symbol value.

42. The computer-readable medium as recited in claim 39, wherein the instructions for determining the communications channel impulse response further comprise instructions which, when executed by the one or more processors, cause the one or more processors to carry out the step of:
  determining the communications channel impulse response based on an inverse fast Fourier transform (FFT) of the communications channel transfer function.

43. The computer-readable medium as recited in claim 39, wherein the instructions for determining the noise covariance further comprise instructions which, when executed by the one or more processors, cause the one or more processors to carry out the step of:
  determining the noise covariance based on an inverse fast Fourier transform (FFT) of the noise power spectral density.

44. The computer-readable medium as recited in claim 39, wherein the instructions for determining the coefficients further comprise instructions which, when executed by the one or more processors, cause the one or more processors to carry out the steps of:
  forming two matrices based on the communications channel impulse response and the noise covariance;
  generating a quadratic expression based on the two matrices; and
  minimizing the quadratic expression to determine the coefficients.

45. A receiver for processing data received from a communications channel comprising:
  an equalizer configured to equalize received data from the communications channel and generate equalized data, wherein the received data is based upon both modulated data and noise that includes noise from a source that is external to the receiver, and the modulated data is the result of original data modulated onto one or more carriers, and wherein the equalizer is configured to use an algorithm with a set of one or more coefficients selected based on noise power and an impulse response of the communications channel; and
  a demodulator configured to generate an estimate of the original data by demodulating the equalized data.

46. The apparatus as recited in claim 45, wherein the set of one or more coefficients is selected to optimize an impulse response length of the communications channel to reduce interference.

47. The apparatus as recited in claim 46, wherein the interference includes inter-symbol interference.

48. The apparatus as recited in claim 46, wherein the interference includes inter-channel interference.

49. The apparatus as recited in claim 45, wherein the set of one or more coefficients is selected to reduce the noise power.

50. The apparatus as recited in claim 49, wherein the set of one or more coefficients is selected to minimize the noise power.

51. The apparatus as recited in claim 45, wherein the set of one or more coefficients is selected to simultaneously optimize an impulse response length of the communications channel to reduce interference and reduce the noise power.

52. The apparatus as recited in claim 45, wherein a cyclic prefix is added to the modulated data and the set of one or more coefficients is selected to ensure that an impulse response of the communications channel and the equalizer is less than a length of the cyclic prefix.

53. The apparatus as recited in claim 45, wherein the set of one or more coefficients is selected to reduce the noise power due to inter-symbol interference, inter-channel interference, and noise from one or more additional interference sources.

54. The apparatus as recited in claim 53, wherein the one or more additional interference sources are external to the receiver and includes at least one interference source selected from the group consisting of crosstalk, amplitude-modulated signals, and white Gaussian noise.

55. The apparatus as recited in claim 45, wherein the set of one or more coefficients are selected by minimizing a function of communications channel impulse response and noise power.

56. The apparatus as recited in claim 45, wherein the set of one or more coefficients are selected based on a noise power spectral density.

57. The apparatus as recited in claim 45, wherein the equalizer is configured to process the received data using a finite impulse response (FIR) filter.

58. The apparatus as recited in claim 57, wherein the received data is modulated using discrete multitone modulation and a set of one or more (FIR) coefficients for the FIR filter is selected to the minimize noise power and optimize impulse response length of the communications channel to reduce interference.

59. The apparatus as recited in claim 45, wherein the communications channel is a twisted pair telephone line.

60. The apparatus as recited in claim 59, wherein the twisted pair telephone line uses a transmission protocol selected from the group consisting of Asymmetric Digital Subscriber Line (ADSL), G.Lite and Very High Bit Rate DSL (VDSL).

61. An apparatus for determining coefficients for use in a filter to process data received from a communications channel comprising:
    means for determining a communications channel transfer function based on the received data;
    means for determining a noise power spectral density based on the received data;
    means for determining a communications channel impulse response based on the communications channel transfer function;
    means for determining a noise covariance based on the noise power spectral density; and
    means for determining the coefficients based on the communications channel impulse response and the noise covariance.

62. The apparatus as recited in claim 61, wherein the means for determining the communications channel transfer function includes:
    means for accumulating a plurality of symbol values based on the received data;
    means for determining an average received symbol value based on the received data; and
    means for determining the communications channel transfer function based on the plurality of symbol values and the average received symbol value.

63. The apparatus as recited in claim 61, wherein the means for determining the noise power spectral density includes:
    means for measuring a plurality of symbol values based on the received data;
    means for determining an average received symbol value based on the received data; and
    means for determining the noise power spectral density based on the plurality of symbol values and the average received symbol value.

64. The apparatus as recited in claim 61, wherein the means for determining the communications channel impulse response includes:
    means for determining the communications channel impulse response based on an inverse fast Fourier transform (FFT) of the communications channel transfer function.

65. The apparatus as recited in claim 61, wherein the means for determining the noise covariance includes:
    means for determining the noise covariance based on an inverse fast Fourier transform (FFT) of the noise power spectral density.

66. The apparatus as recited in claim 61, wherein the means for determining the coefficients includes:
    means for forming two matrices based on the communications channel impulse response and the noise covariance;
    means for generating a quadratic expression based on the two matrices; and
    means for minimizing the quadratic expression to determine the coefficients.

67. A method for generating coefficient data comprising the computer-implemented step of:
    at a receiver, generating coefficient data that represents a set of one or more coefficients that are selected based on noise power and an impulse response of a communications channel when the coefficients are used with an algorithm to equalize received data from the communications channel, wherein the received data is based upon both modulated data and noise that includes noise from a source that is external to the receiver and the modulated data is the result of original data modulated onto one or more carriers.

68. A computer-readable medium carrying coefficient data to be used by a receiver and that represents a set of one or more coefficients that are selected based on noise power and an impulse response of a communications channel when the coefficients are used with an algorithm to equalize received data from the communications channel, wherein the received data is based upon both modulated data and noise that includes noise from a source that is external to the receiver and the modulated data is the result of original data modulated onto one or more carriers.

69. An apparatus for generating coefficient data comprising:
    a storage medium for storing the coefficient data; and
    a coefficient generator that is within a receiver and that is configured to generate the coefficient data, wherein the coefficient data represents a set of one or more coefficients that are selected based on noise power and an impulse response of a communications channel when the coefficients are used with an algorithm to equalize received data from the communications channel, wherein the received data is based upon both modulated data and noise that includes noise from a source that is external to the receiver and the modulated data is the result of original data modulated onto one or more carriers.

* * * * *